US012454850B2

(12) United States Patent
Miller et al.

(10) Patent No.: US 12,454,850 B2
(45) Date of Patent: Oct. 28, 2025

(54) BALL AND SOCKET SECURITY TAG

(71) Applicant: Sensormatic Electronics, LLC, Boca Raton, FL (US)

(72) Inventors: Channing E. Miller, Boca Raton, FL (US); Simon Rossi, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 122 days.

(21) Appl. No.: 18/285,467

(22) PCT Filed: Mar. 4, 2022

(86) PCT No.: PCT/US2022/070983
§ 371 (c)(1),
(2) Date: Oct. 3, 2023

(87) PCT Pub. No.: WO2022/187861
PCT Pub. Date: Sep. 9, 2022

(65) Prior Publication Data

US 2024/0360701 A1 Oct. 31, 2024

Related U.S. Application Data

(60) Provisional application No. 63/157,457, filed on Mar. 5, 2021.

(51) Int. Cl.
*E05B 73/00* (2006.01)

(52) U.S. Cl.
CPC ................................ *E05B 73/0017* (2013.01)

(58) Field of Classification Search
CPC .. E05B 73/00; E05B 73/0017; Y10T 70/5004; Y10T 70/5009; Y10T 70/50
(Continued)

(56) References Cited

U.S. PATENT DOCUMENTS 4,460,093 A 7/1984 Otema
7,005,989 B2 * 2/2006 Benoit ............... G08B 13/2434 340/568.1

(Continued)

FOREIGN PATENT DOCUMENTS

GB 2440420 A 1/2008

OTHER PUBLICATIONS

International Search Report and Written Opinion for International Patent Application No. PCT/US2022/070983, mailed Jun. 30, 2022 (10 pages).

(Continued)

*Primary Examiner* — Suzanne L Barrett
(74) *Attorney, Agent, or Firm* — ArentFox Schiff LLP

(57) ABSTRACT

An article security device that is selectively removable from an article, the article security device may include a security tag and an elongate member movably connected with the security tag and having an elongate member first end and a elongate member second end. The elongate member may be configured to contain or to be contained by at least a portion of the article. The security device may further include a selectively removable locking member that is configured to connect to the elongate member second end to enable the security device to be selectively removable from the article, wherein the selectively removable locking member includes a locking mechanism having a locked position relative to the elongate member second end and an unlocked position relative to the elongate member second end.

14 Claims, 15 Drawing Sheets

(58) Field of Classification Search
USPC .................................................... 70/57.1, 58
See application file for complete search history.

(56) References Cited

U.S. PATENT DOCUMENTS

| | | | | |
|---|---|---|---|---|
| 7,183,914 | B2 * | 2/2007 | Norman | G09F 3/14 340/568.1 |
| 7,286,055 | B2 * | 10/2007 | Girvin | G09F 3/005 340/572.9 |
| D578,030 | S * | 10/2008 | Yang | D10/106.94 |
| 7,808,390 | B2 * | 10/2010 | Sayegh | E05B 73/0017 340/572.8 |
| 8,408,472 | B2 | 4/2013 | Yang | |
| 2003/0020613 | A1 | 1/2003 | Cosnard | |
| 2004/0051640 | A1 | 3/2004 | Benoit et al. | |
| 2007/0120686 | A1 | 5/2007 | Spagna | |
| 2011/0283754 | A1 * | 11/2011 | Ezzo | E05B 73/0005 70/57.1 |
| 2013/0032637 | A1 | 2/2013 | Yang | |
| 2013/0340489 | A1 * | 12/2013 | Kozlowski, Jr. | E05B 73/0017 70/57.1 |
| 2016/0140820 | A1 | 5/2016 | Joseph | |

OTHER PUBLICATIONS

Office Action received for Chinese Patent Application No. 202280032094.3, mailed on Sep. 17, 2025, 12 pages (6 pages of English Translation and 6 pages of Original Document).

* cited by examiner

BALL AND SOCKET SECURITY TAG

CROSS-REFERENCE TO RELATED APPLICATIONS

This application is a 35 U.S.C. § 371 National Phase of International Patent Application No. PCT/US2022/070983, entitled “BALL AND SOCKET SECURITY TAG,” and filed Mar. 4, 2022, which claims the benefit of U.S. Provisional Patent Application No. 63/157,457, entitled “BALL AND SOCKET SECURITY TAG,” and filed on Mar. 5, 2021, which are expressly incorporated by reference herein in their entireties.

TECHNICAL FIELD

The present disclosure generally relates to a security tag for securing an item of merchandise, and more particularly, to a ball and socket security tag.

BACKGROUND

A typical security tag is designed to prevent unauthorized removal of an article from a controlled area or tracking of inventory, such as in a retail store. Most security tags that exist today are very cumbersome and take away from the aesthetic of the article to which it is attached. This forces the retailer to decide on security versus not obstructing the article to which it is attached, especially when the security tag is attached to higher end merchandise.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The security tag of the present disclosure is much smaller in size as compared to existing security tags, and is meant to have a minimal visual profile so that the retailer can have security without taking away from the design of the article. In addition, in one aspect, the security tag may include an elongate member; the elongate member may include a elongate member pass through that allows the security tag to be flipped over so that a bar code, price tag, or label can be added to the back of the tag, removing the need to add another price label to the article.

An example aspect includes an article security device that is selectively removable from an article. The article security device comprises a security tag and an elongate member, which may include an elongate member movably connected with the security tag, wherein the elongate member may include a first end and a second end. The elongate member is configured to contain or to be contained by at least a portion of the article, and has a selectively removable locking member that is configured to connect to the second end and enables the security device to be selectively removable from the article. The selectively removable locking member includes a locking mechanism having a locked position relative to the second end and an unlocked position relative to the second end.

Additional aspects of the present disclosure are described in more detail below.

BRIEF DESCRIPTION OF THE DRAWINGS

The features believed to be characteristic of aspects of the disclosure are set forth in the appended claims. In the description that follows, like parts are marked throughout the specification and drawings with the same numerals. The drawing figures are not necessarily drawn to scale and certain figures may be shown in exaggerated or generalized form in the interest of clarity and conciseness. The disclosure itself, however, as well as a preferred mode of use and further advantages thereof, will be best understood by reference to the following detailed description of illustrative aspects of the disclosure when read in conjunction with the accompanying drawings, wherein:

DETAILED DESCRIPTION

Figure 1:
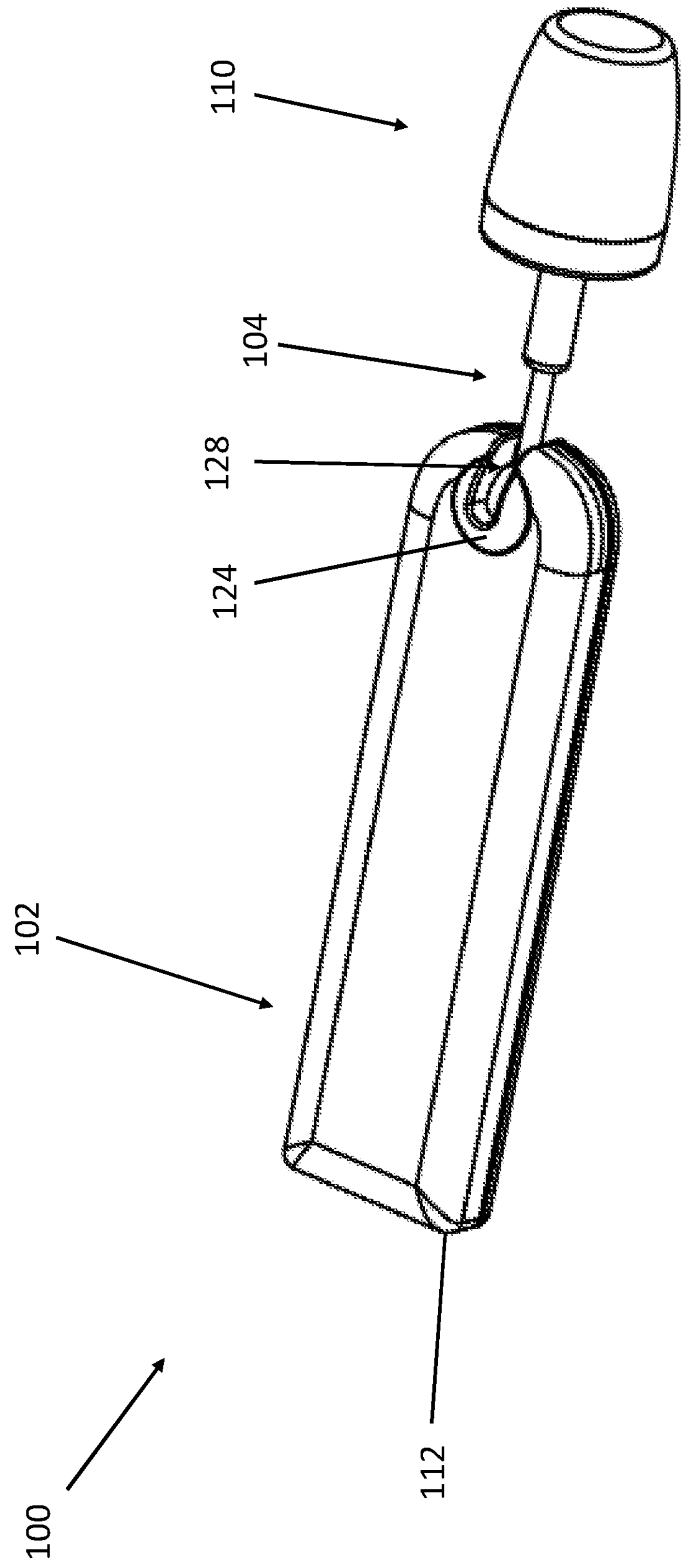
FIG. 1 is a front perspective view of an example of an article security device.
Figure 2:
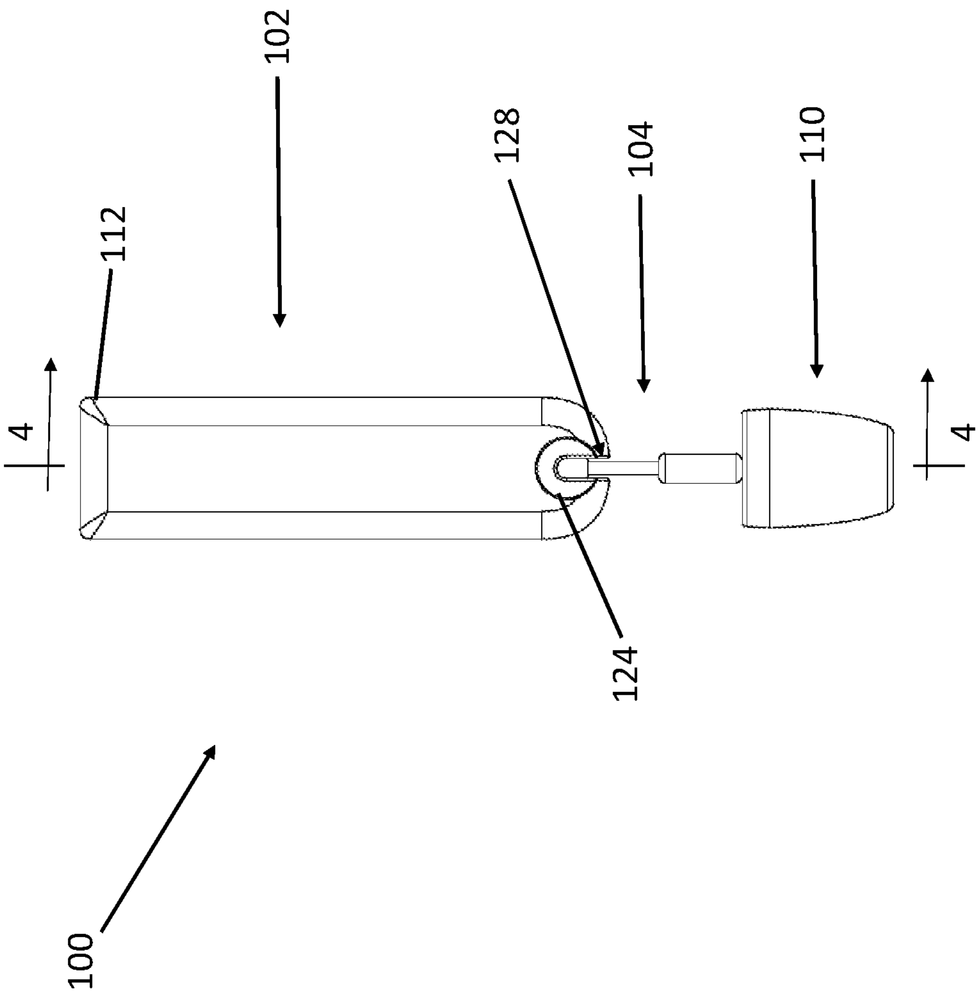
FIG. 2 is a front plan view of the article security device of FIG. 1.

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details.

For purposes of the disclosure, directional terms are expressed generally with relation to a standard frame of reference when the system and apparatus described herein is installed and in an in-use orientation.

Throughout the disclosure, the term substantially may be used as a modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of skill in the relevant art.

The following is a broad overview provided to add context to aspects and example advantages of aspects of the disclosure. It is noted that the examples provided in this overview are not intended to be limiting and are provided for ease of understanding of the disclosure.

Aspects of the present disclosure relate to an article security device. The disclosed aspects of the article security device are slimmer and fit the aesthetic design of the article. The described article security device include a security tag, an elongate member movably connected with the security tag, wherein the elongate member is configured to contain or to be contained by at least a portion of the article, and a selectively removable locking member that is configured to connect to an end of the elongate member to enable the security device to be selectively removable from the article. In some aspects, examples of the article security device include a containment portion and an end of the elongate member includes an end cap member configured to be captively contained within the containment portion. For example, the containment portion and the end cap member may form a ball and socket joint that allows the security tag and elongate member to be relatively rotated in one or more directions. In addition, in other aspects, examples of the article security device may have a pass through for a elongate member, which gives the article security device the ability to be flipped up where a bar code, price tag, company logo, etc., is easily seen. The elongate member pass through is integrated into the article security device and allows it to be freely moved up and down a length of the elongate member. The tag locks onto the article using a 3 ball clutch in a housing and a captivated elongate member pin.

Referring to FIGS. 1-5, in an example aspect, the article security device 100 for attaching to an article, such as a product, includes a security tag 102, an elongate member 104 movably connected to the security tag 102 at an elongate member first end 106 (FIG. 3), and a locking member 110, which is removably connected to the elongate member 104 at a elongate member second end 108 (FIG. 3). In some aspects, elongate member 104 include a unitary piece of one or more wires, while in other aspects, the elongate member first end 106 and the elongate member second end 108 are connected by an elongate member connection member 122 (FIG. 3). The elongate member 104 is configured to contain or be contained by the at least a portion of the article. For example, in an aspect, when connected to a portion of the article, the security tag 102 may be on one side of the portion of the article and the locking member 110 may be located on the other side of the portion of the article.

The security tag 102 includes a housing 112 within which a security element 114 (FIG. 3) is mounted, and the housing 112 includes a containment structure 124 configured to movably retain an end of the elongate member 104. In an aspect, the housing 112 may be formed of any material that allows transmission of wireless signals to or from the security element 114. For example, the material of the housing 112 may include, but is not limited to, a plastic. Further, for example, the security element 114 may include, but is not limited to, an acousto-magnetic security tag, a radio frequency identifier (RFID) security tag, an electro-magnetic security tag, and/or any other one or any combination of electronic article surveillance tags. However, the present aspects are not limited to an RFID sensor, and any combination and number of different sensors within a single security tag may be desirable for each specific application. For example, in some aspects, the sensor security element 114 may include more than one sensor, and each sensor may be an RFID sensor or may be another type of sensor. In some non-limiting aspects, for example, the security element may include one or more Electronic Article Surveillance (EAS) sensors instead of or in addition to one or more RFID sensors, and each EAS sensor may emit a detectable signal in response to an interrogation field. In some non-limiting aspects, for example, the security element 114 may include one or more Near-field communication (NFC) and/or one or more acousto-magnetic (AM) sensors instead of or in addition to one or more RFID sensors and/or one or more EAS sensors.

In an aspect, the housing 112 includes a housing top portion 116 connected to a housing bottom portion 118. The security element 114 is housed within and protected by the housing 112. The housing top portion 116 and housing bottom portion 118 include the containment structure 124 that connects to the elongate member 104. In an aspect, referring specifically to FIG. 3, the containment structure 124 includes corresponding concave walls 124*a*, 124*b*, respectively formed in the housing top portion 116 and the housing bottom portion 118, that cooperate to receive and movably contain an end cap member 120 connected to the first end 106 of the elongate member 104. Additionally, a portion of the concave walls 124*a*, 124*b*, when connected, are spaced apart and thus combine to form an opening 128 sized to allow the elongate member 104 to pass through. Further, the opening 128 is dimensioned so that the end cap member 120 cannot pass through while still allowing the elongate member 104 to pass therethrough. In an aspect, the opening 128 is an elongated slot allowing the elongate member 104 and the end cap member 120 to pivot and/or rotate with respect to the security tag 102.

Figure 3A:
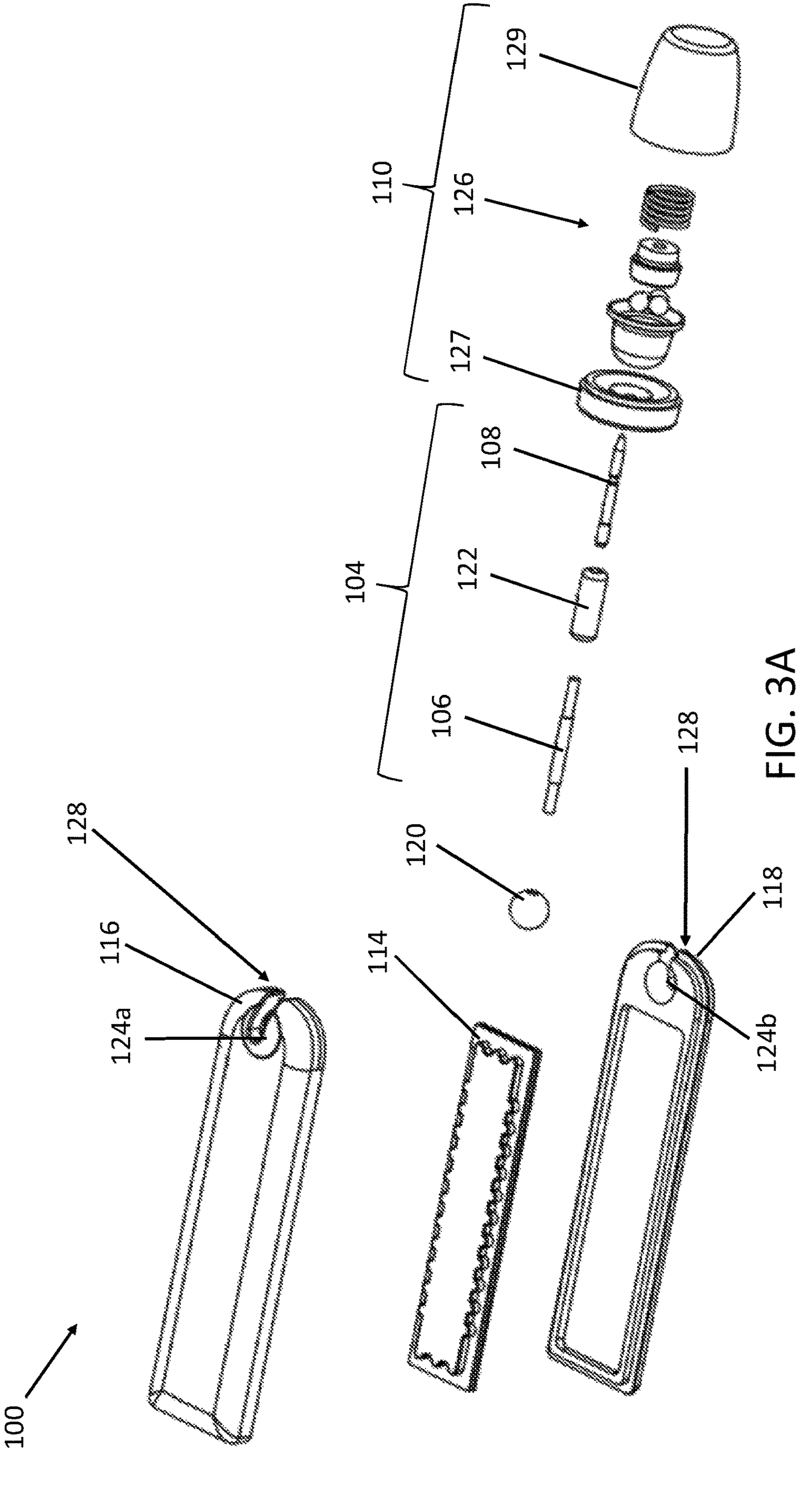
FIG. 3A is an exploded perspective view of the article security device of FIG. 1.
Figure 3B:
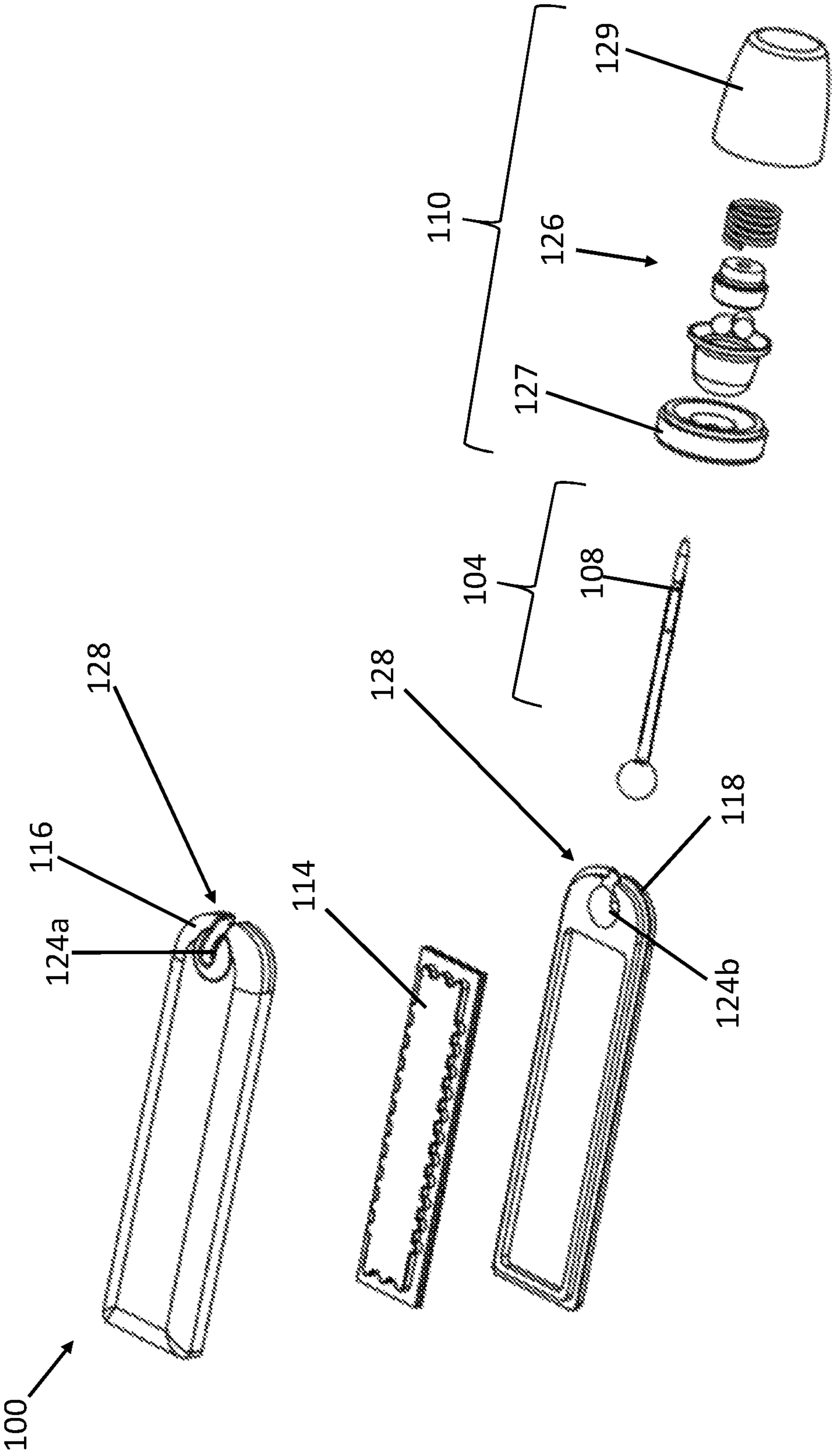
FIG. 3B is an exploded perspective view of the article security device of FIG. 1 showing alternative aspects of the disclosure.
Figure 4:
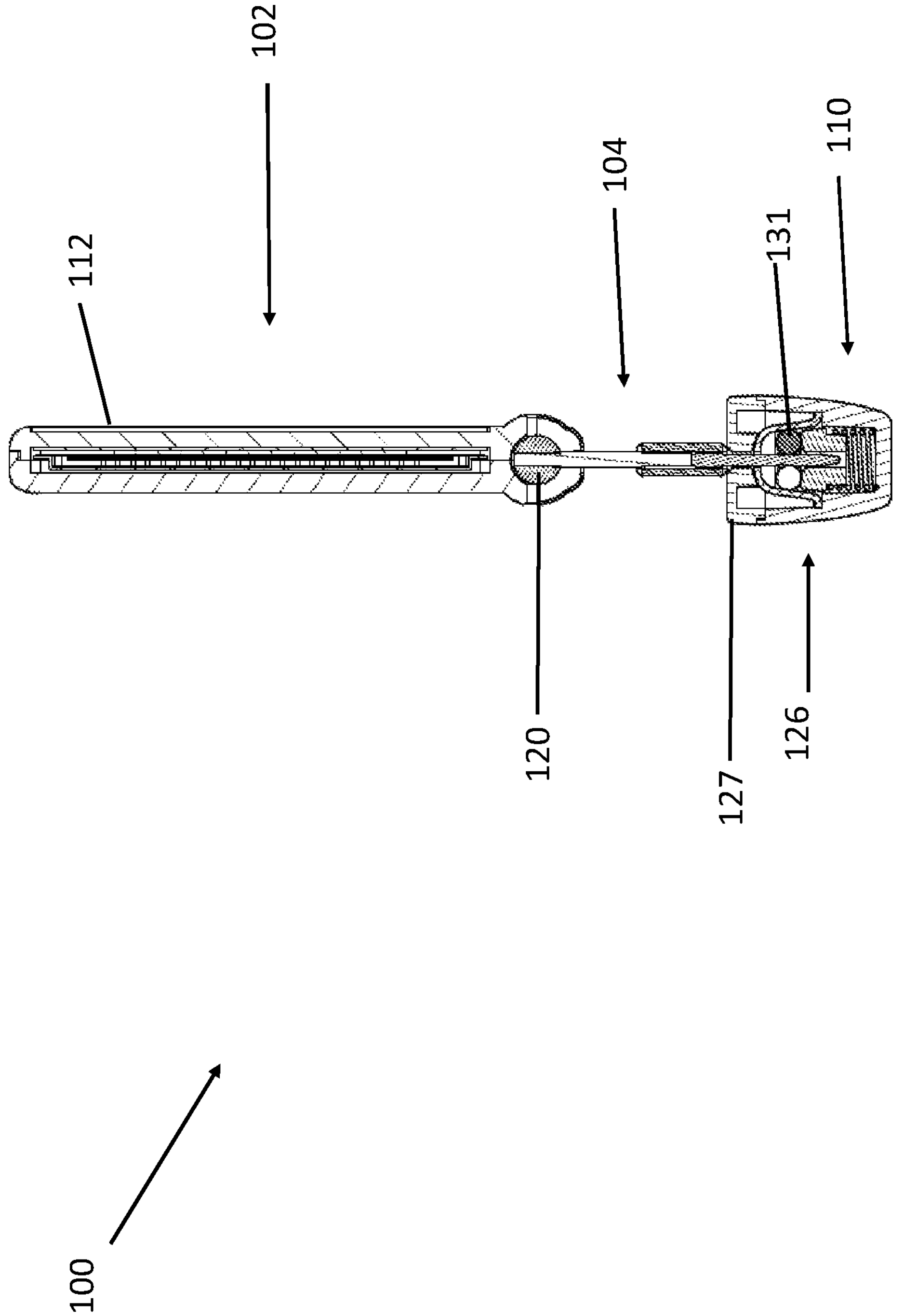
FIG. 4 is a cross sectional view of the article security device along line 4-4 of FIG. 2.

The elongate member 104 includes the end cap member 120, which is connected to the elongate member first end 106 and which is configured to be movably connected to the tag housing 112. The elongate member 104 may be formed of any material that may be secured to the security tag 102 and that may resist being cut or being separated from the security tag 102 once secured thereto. For example, the material of the elongate member 104 may include, but it not limited to, a cable comprised of a plurality of braided or wound metallic wires. One example of an elongate member comprising a cable is shown in FIG. 3A. In some aspects, the elongate member 104 may be bendable or flexible along its length, for example, to allow the elongate member 104 to be wrapped around an article or to be positioned through or across non-linear portions of the article. In one aspect, the elongate member 104 may be formed as an elongated rigid or semi-rigid member. One example of an elongate member comprised of a rigid or semi-rigid member is shown in FIG. 3B. For example, the elongated member 104 may be shaped as an elongated rigid or semi-rigid pin. Further, for example, the end cap member 120 may be formed of any material that may be securely connected to the elongate member 104, and that optionally is securely connectable to the housing 112 or non-deformable when constrained within the containment structure 124. For instance, the end cap member 120 may be formed of a metal, a plastic, a ceramic, or a composite material. In an aspect, the end cap member 120 is captively contained within the containment structure 124 between the respective concave walls 124*a*, 124*b*, of the housing top portion 116 and housing bottom portion 118. In an aspect, the concave walls 124*a*, 124*b* and the end cap member 120 may have a spherical, conical, disk, square or rectangular, or rounded shape that, in combination with the opening 128, allows the security tag 102 and the elongate member 104 to be relatively movable and/or rotatable. In another aspect, the end cap member 120 may be shaped or the elongate member 104 be bent or otherwise formed to be J-shaped, T-shaped, or shaped as a loop or ellipse with an opening formed therein. In the aforementioned examples, the concave walls 124*a* and/or 124*b* may be shaped to correspond with the end cap for captively containing the end cap while still allowing the elongate member to be relatively movable and/or rotatable This allows the article security device 100 to be easily moved or rotated to be secured to an article, and/or to be positioned such that a bar code, price tag, company logo, etc., located on one side of the security tag 102 may be easily seen. In other aspects, the elongate member 104 may be non-movably connected to the security tag 102, e.g., the first end 106 and/or the end cap member 120 may be fixedly connected to the housing 112. In this case, the security device 100 may utilize the bendability along the length of the elongate member 104 to provide flexibility and non-linear positioning of the elongate member 104 relative to the article. For example, as shown in FIG. 1-3A, the elongate member 104 may for example include a flexible cable or other flexible member. However, the elongate member 104 is not necessarily limited to including a flexible member and may for example include a rigid or semi-rigid member as shown in FIG. 3B, for example.

The locking member 110 is connectable to the elongate member 104 at the elongate member second end 108 and includes housing members 127, 129 (FIGS. 3A and 3B) that contain a locking mechanism 126 (FIGS. 3A and 3B) that is removably connectable to the elongate member second end 108, which may include a pin. The locking member 110 is selectively removable from the elongate member 104 so as to allow the article security device 100 to be attached to the article, and to allow the article to be removable from the article security device 100. The locking mechanism 126 (FIGS. 3A and 3B) has a locked position relative to the elongate member second end 108 and an unlocked position relative to the elongate member second end 108. The locking mechanism 126 allows for the article to be locked within the article security device 100 when the locking member 110 is in the locked position and for the article to be removable from the article security device 100 when the locking member 110 is in the unlocked position and the locking member 110 is removed.

The locking mechanism 126 may include any number of different locking mechanisms. In an aspect, but not limited hereto, the locking mechanism is a 3-ball clutch locking mechanism, including 3 balls biasedly positionable within a bell housing by a platform movable by a biasing mechanism, e.g., a spring. In this example, referring to FIG. 4, the housing member 127 and bell housing 131 include an opening to receive the elongate member second end 108 or a pin connected thereto, such that the locking mechanism 126 can frictionally engage thereto to secure the locking member 110 to the elongate member 104. The locking member 110 and locking mechanism 126 may be formed of any material or materials suitable to resist being forcibly disconnected from the elongate member 104, such materials including but not limited to a metal, a plastic, a ceramic, or a composite material.

Figure 5:
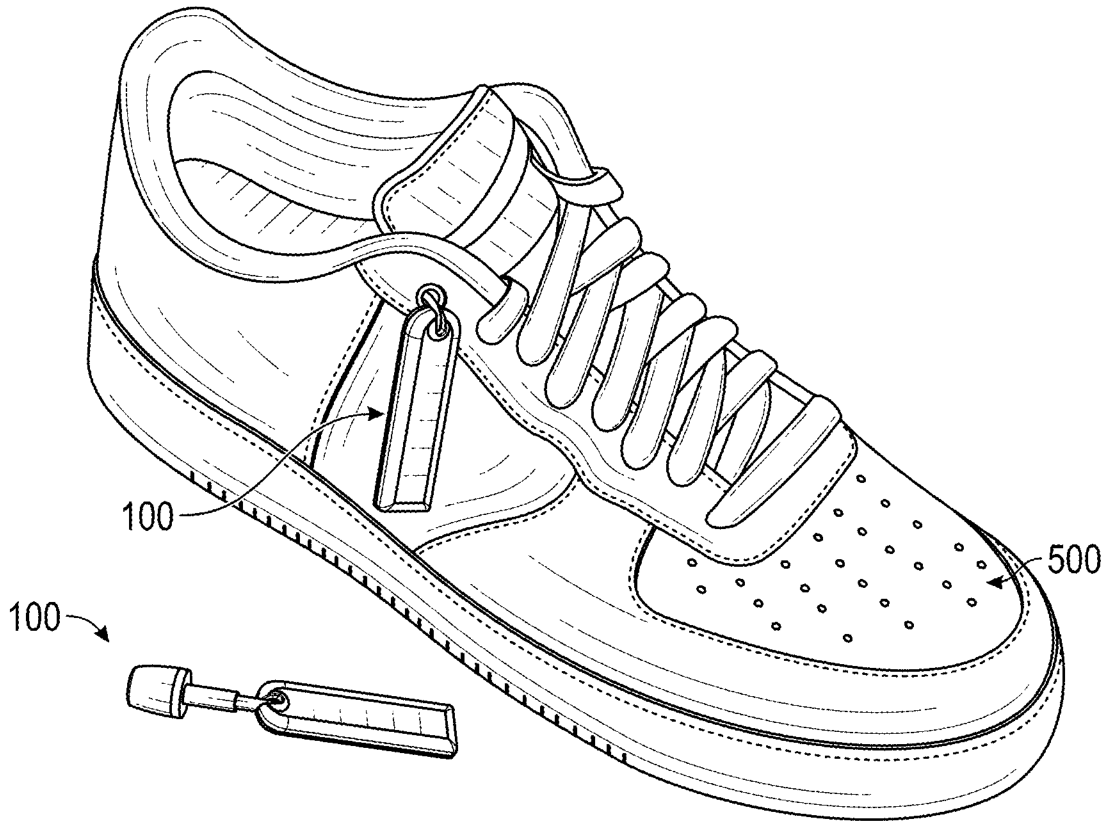
FIG. 5 is a perspective view of the article security device of FIG. 1 by itself and also attached on an example article, e.g., a sneaker in this case.
Figure 6:
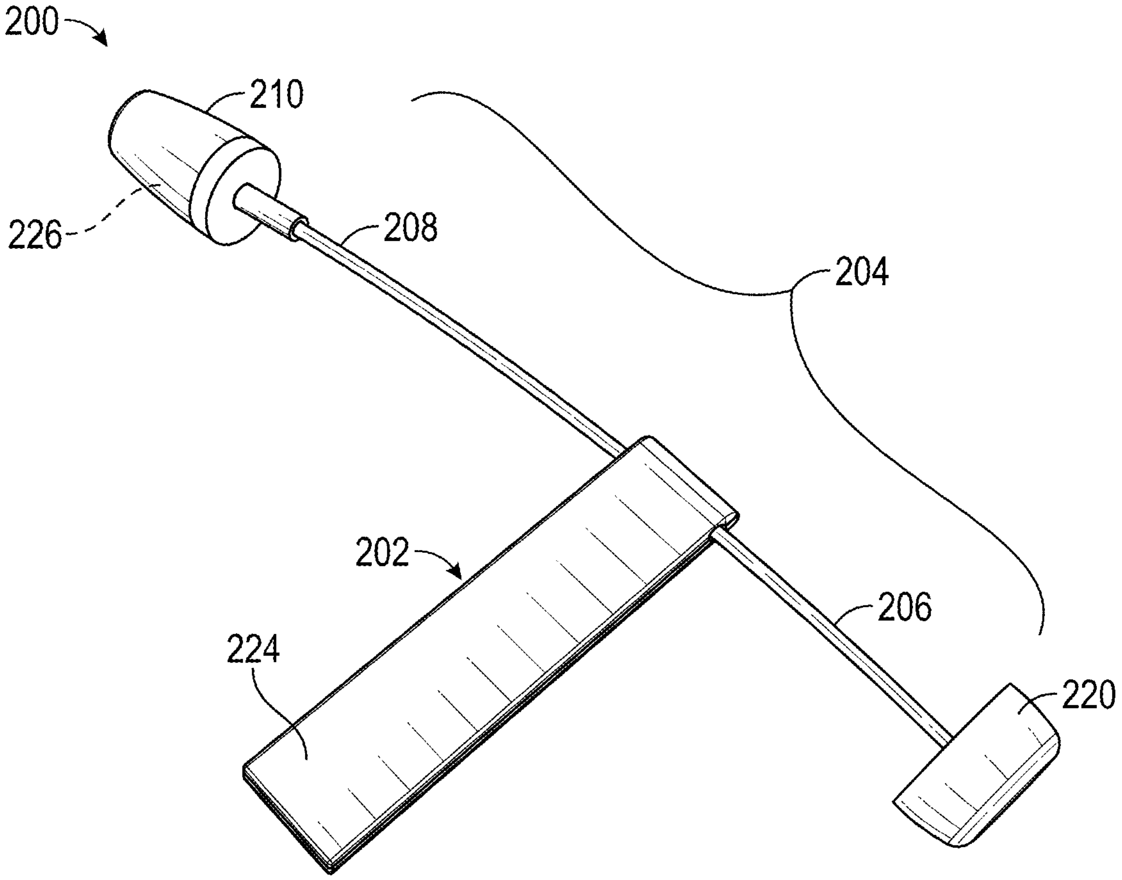
FIG. 6 is a front perspective view of another example of an article security device.
Figure 7:
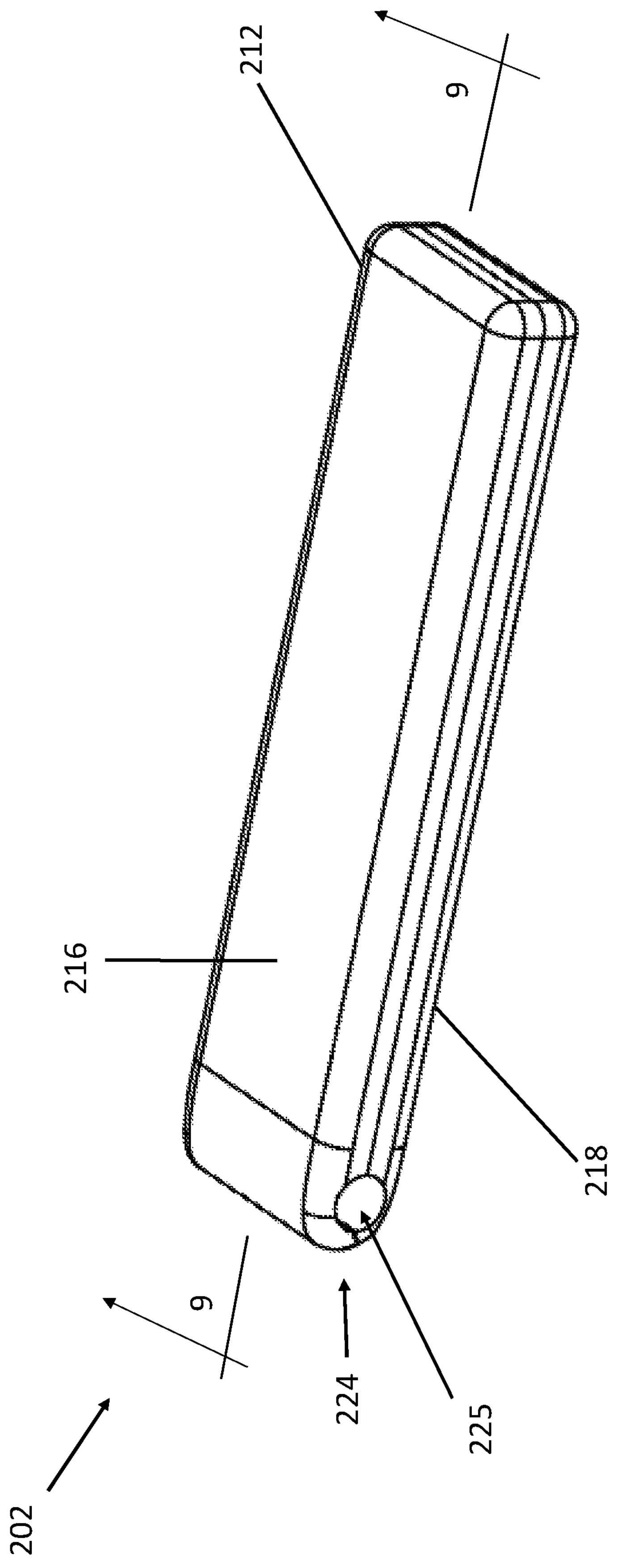
FIG. 7 is a front perspective view of the security tag of the article security device of FIG. 6.
Figure 8:
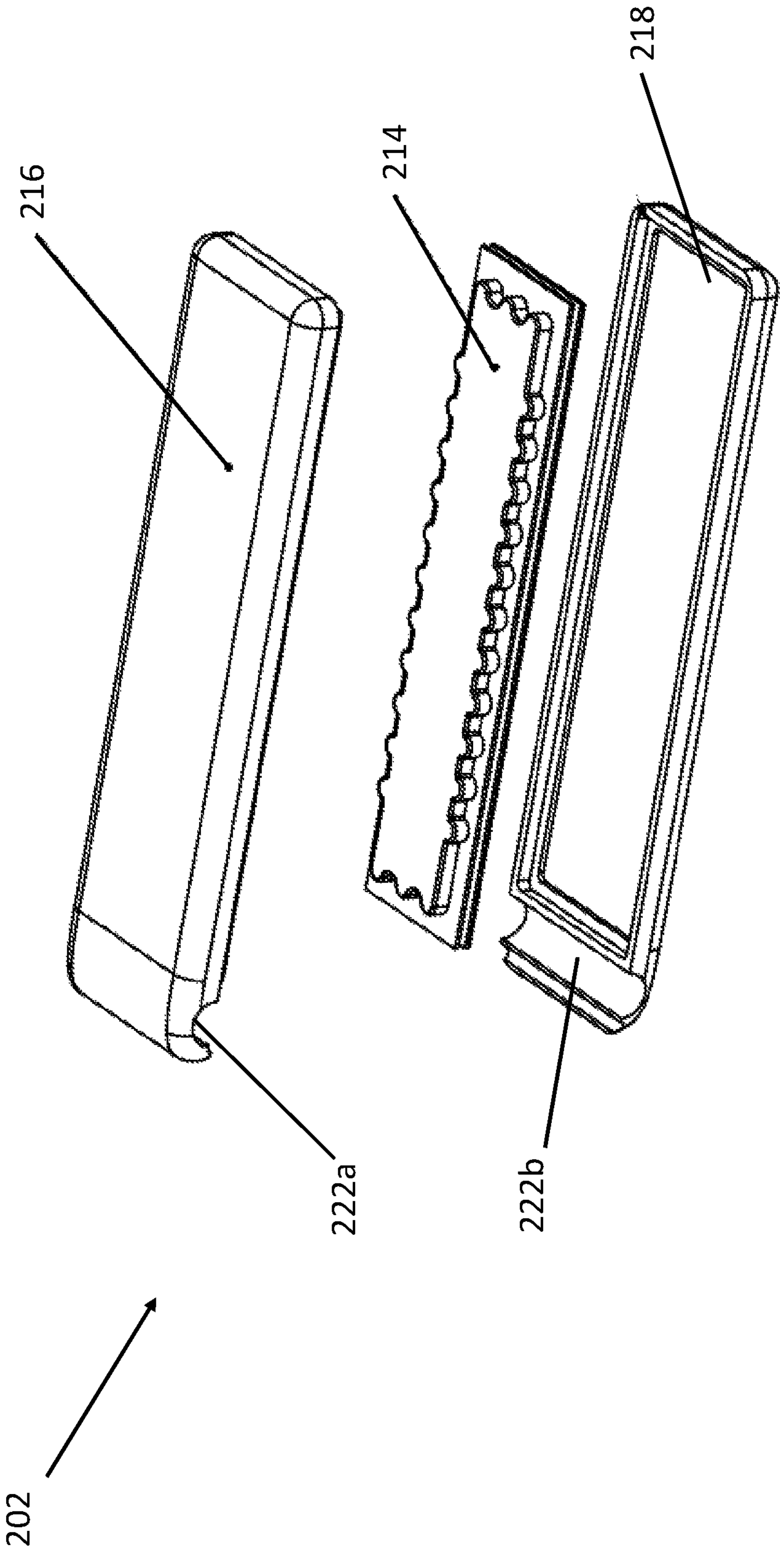
FIG. 8 is an exploded perspective view of the security tag of the article security device of FIG. 6.
Figure 9:
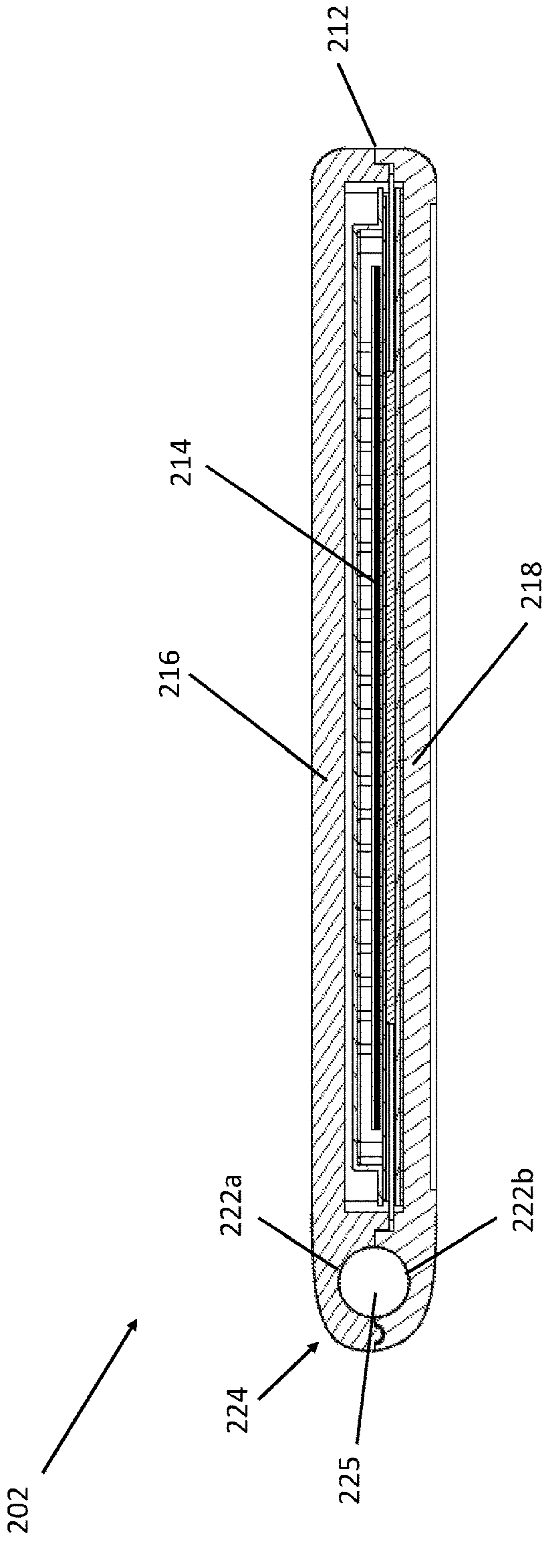
FIG. 9 is a cross sectional view of the security tag of the article security device along line 9-9 of FIG. 7.

Referring now to FIG. 5, in an aspect, the article security device 100 can be seen as attached to an example article 500, e.g., a sneaker in this case. The elongate member 104 is configured to run through the article, such as through the eyelet of the sneaker in the present example, and the tag 102 will be on one end, which can be on the outside of the article, and the locking member 110 is located on the opposite end.

Referring to FIGS. 6-13, in another example aspect, an article security device 200 includes a security tag 202 and a elongate member 204 extending through the security tag 202. The security tag 202 and elongate member 204 may be similar to the security tag 102 and elongate member 104 described above, however, in this example the security tag 202 includes a containment structure 224 that extends through a portion of the security tag 202. The elongate member 204 further comprises a elongate member first end 206, which is connected to an end cap member 220, and a elongate member second end 208, which is connected to a locking member 210. In an aspect, the end cap member 220 and locking member 210 are similar to the end cap member 120 and locking member 110 described above. The elongate member 204 is configured to contain or be contained by the at least a portion of the article, such that the article is attached to the elongate member 204 between the end cap member 220 and the locking member 210. Further, in this aspect, the security tag 202 may be movable anywhere along the elongate member 204 between the end cap member 220 and the locking member 210.

Similar to the example aspects described above, the security tag 202 further comprises a housing 212 and a security element 214, which may be the same as or similar to housing 112 and security element 114 (e.g., as shown in FIGS. 3A-3B). The housing 212 may include a housing top portion 216 and a housing bottom portion 218 within which the security element 214 is mounted and protected. In an aspect, the housing top portion 216 and the housing bottom portion 218 form the containment structure 224. In one example, for instance, the housing top portion 216 and the housing bottom portion 218 respectively include an internal containment wall 222*a*, 222*b* that combine to define a through hole 225 that extends through the security tag 202. The through hole 225 is configured to have the elongate member 204 passed therethrough so that the security tag 202 is contained on the elongate member 204 between the locking member 210 and the end cap member 220. The through hole 225 is configured to have a diameter wide enough to allow the elongate member 204 to pass through, but narrow enough so as to not allow either the end cap portion 220 or the locking member 210 to pass through.

The security tag 202 is able to freely move along and rotate around the elongate member 204, but be contained within a length of the elongate member 204. This allows article security device 200 to be easily moved or rotated, for example, to enable exposure of a bar code, price tag, company logo, etc., located on one side of the security tag 202.

The locking member 210 is connected to the elongate member at the elongate member second end 208, and may be the same or similar to the locking member 110 described above. The locking member 210 is selectively removable from the elongate member 204 so as to allow the article to be removable from the article security device 200. The selectively removable locking member 210 further includes a locking mechanism 226, similar to locking mechanism 126 described above, having a locked position relative to the elongate member second end 208 and an unlocked position relative to the elongate member second end 208. This allows for the article to be locked within the article security device 200 when the locking member 210 is in the locked position and for the article to be removable from the article security device 200 when the locking member 210 is in the unlocked position and the locking member 210 is removed.

Figure 10:
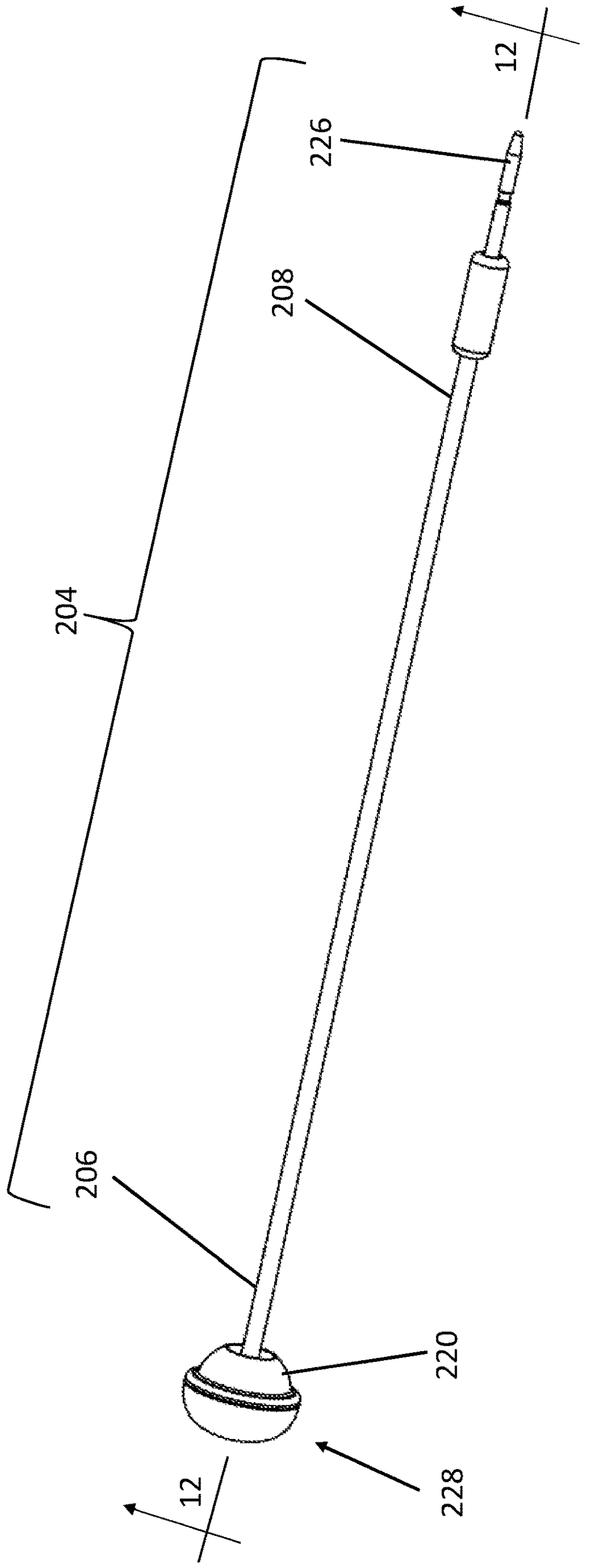
FIG. 10 is a front perspective view of another example of a elongate member and end members for use with the article security device of FIG. 7.
Figure 11A:
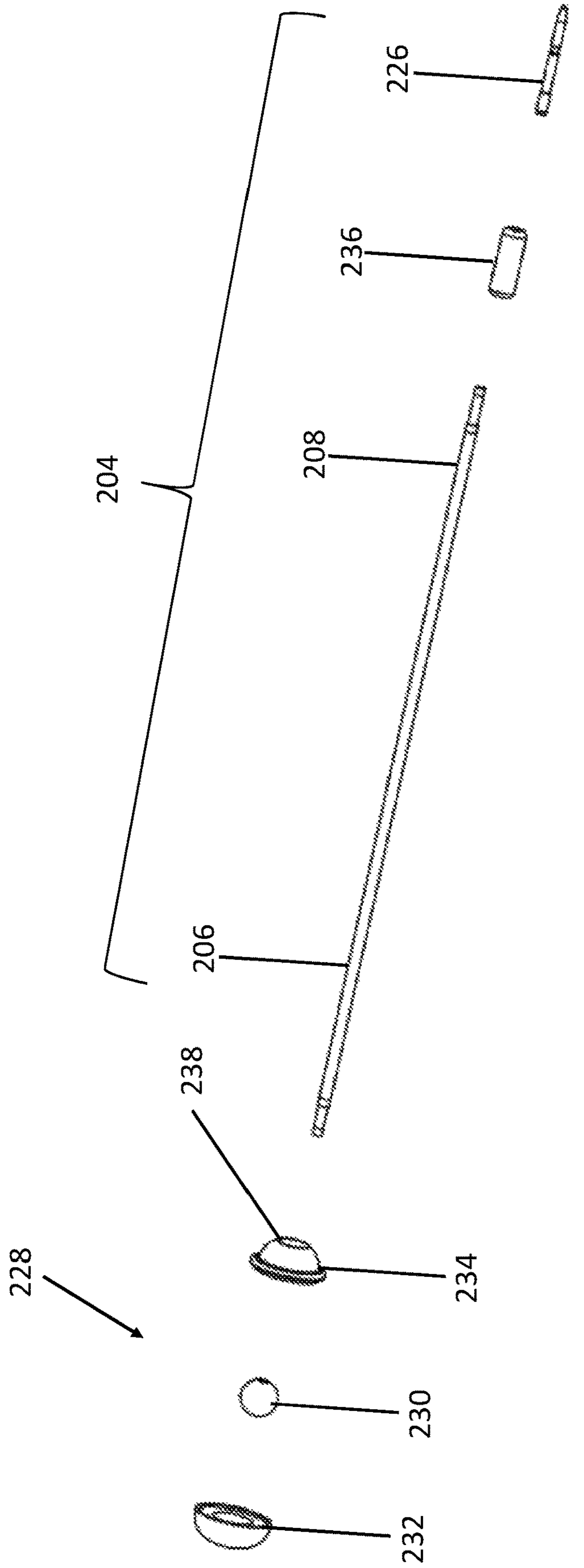
FIG. 11A is an exploded view of the elongate member and end members of FIG. 10.
Figure 11B:
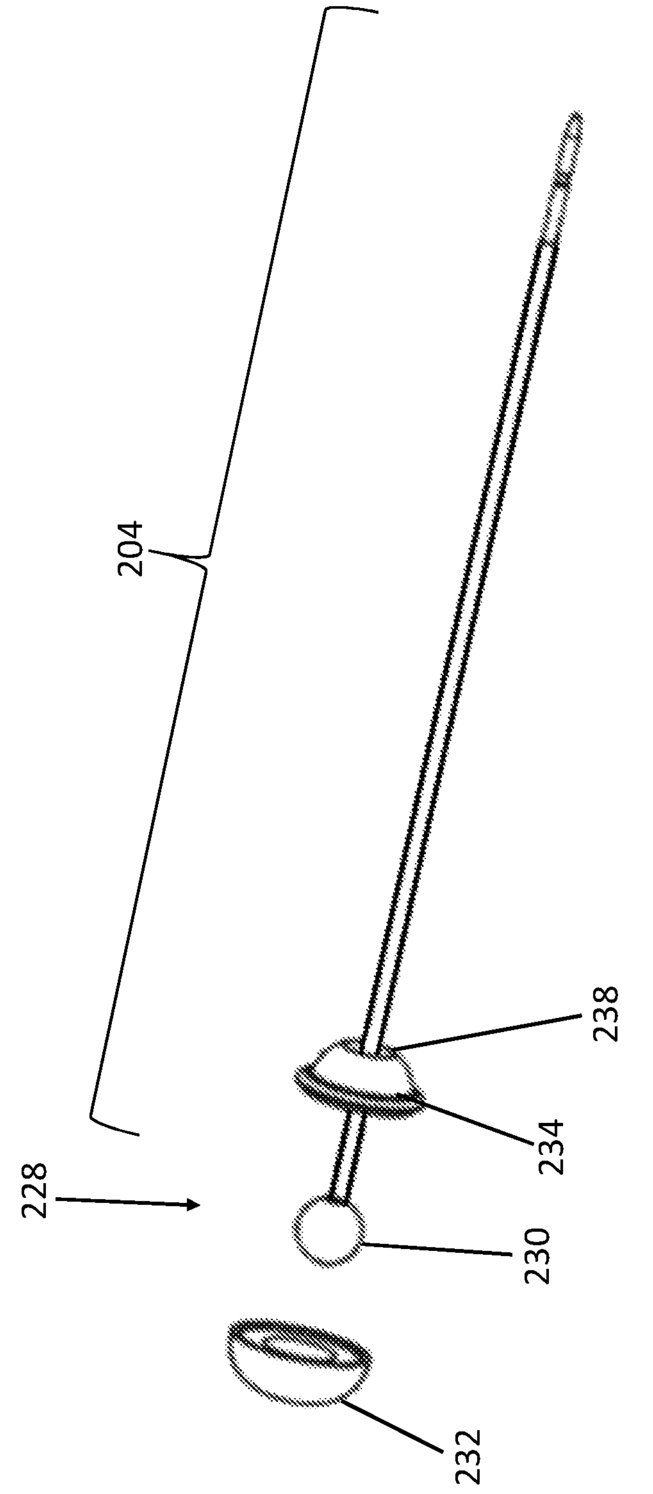
FIG. 11B is an exploded view of the elongate member and end member of FIG. 10 showing alternative aspects of the disclosure.
Figure 12:
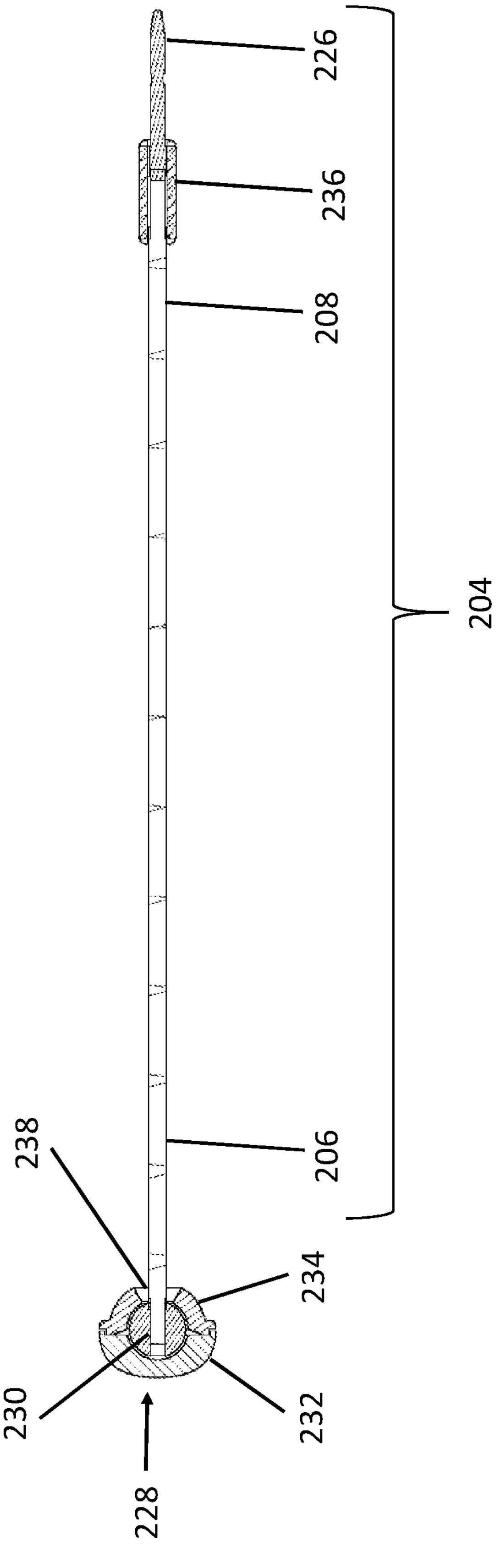
FIG. 12 is a cross sectional view of the elongate member and end members along line 12-12 of FIG. 10.

In one aspect referring to FIGS. 10-12, the end cap portion 220 further comprises an end cap housing 228 and end cap attachment member 230. The endcap housing 228 includes an end cap first portion 232 and end cap second portion 234. In an exemplary embodiment the end cap first portion 232 and end cap second portion 234 are concave and combine to receive the end cap attachment member 230. The end cap second portion 234 has an aperture 238 which allows the elongate member 204 to pass through and attach to the end cap attachment member 230 at the elongate member first end 206.

Figure 13:
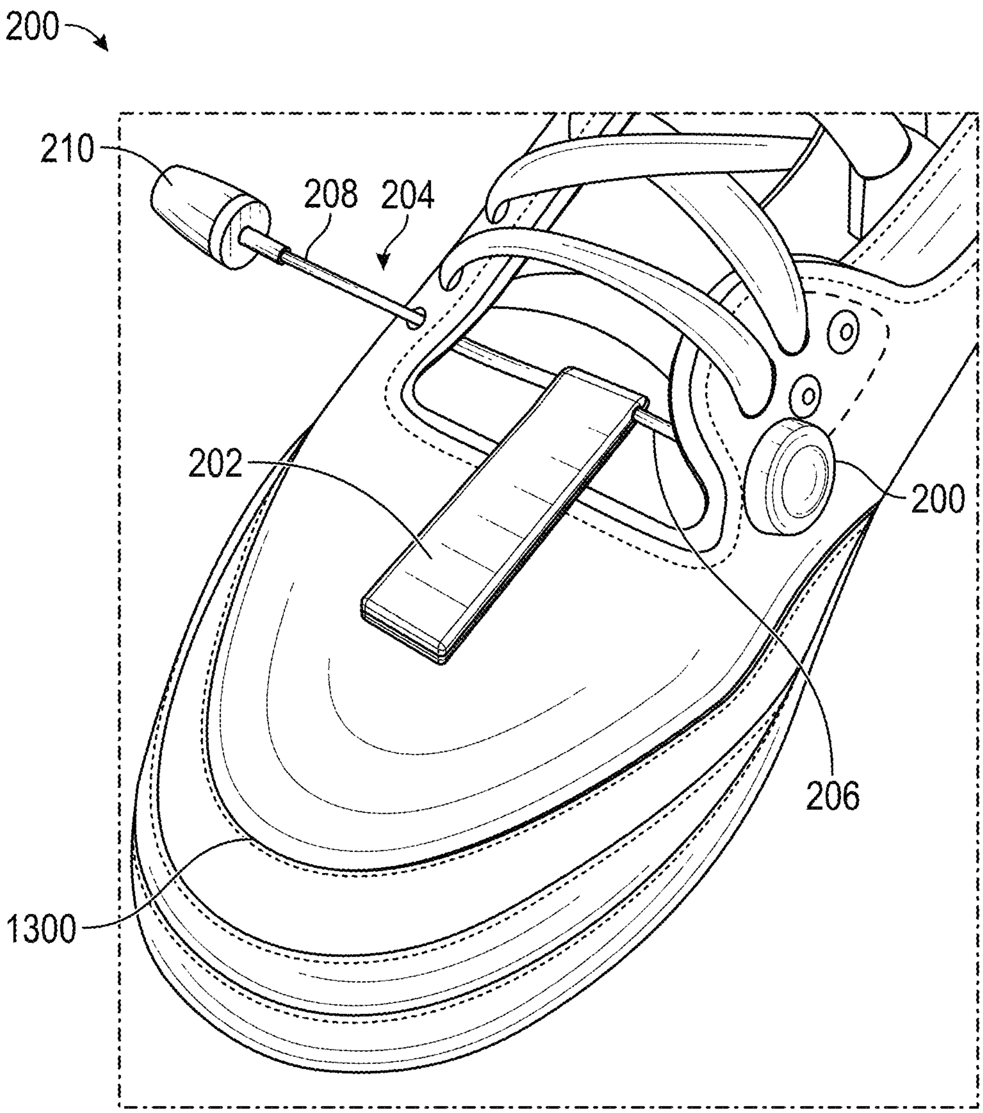
FIG. 13 is a perspective view of the article security device of FIG. 7 attached to an example article, e.g., a sneaker in this case.

Referring now to FIG. 13, an example aspect includes the article security device 200 attached to an example article 1300, such as a sneaker. In this case, the elongate member 204 runs through the article 1300, specifically through opposing eyelets of the sneaker in the present example, and the security tag 202 is slidably contained on the elongate member 104 between the end cap member 220 and the locking member 210. In one example, as shown in FIG. 11A, the elongate member 204 may for example include a flexible cable or other flexible member. However, the elongate member 204 is not necessarily limited to including a flexible member and may for example include a rigid or semi-rigid member as shown in FIG. 11B, for example.

The following clauses describe one or more examples aspects of the present disclosure.

1. An article security device that is selectively removable from an article, comprising:
   a security tag;
   a elongate member movably connected with the security tag and having an elongate member first end and an elongate member second end, wherein the elongate member is configured to contain or to be contained by at least a portion of the article; and
   a selectively removable locking member that is configured to connect to the elongate member second end to enable the security device to be selectively removable from the article, wherein the selectively removable locking member includes a locking mechanism having a locked position relative to the elongate member second end and an unlocked position relative to the elongate member second end.
2. The article security device of clause 1, wherein the security tag comprises a containment portion, and wherein the elongate member first end comprises an end cap member configured to be captively contained within the containment portion.
3. The article security device of any preceding clause, wherein the elongate member has a first diameter and the end cap member is connected to the elongate member first end and has a second diameter that is larger than the first diameter.
4. The article security device of any preceding clause, wherein the containment portion comprises an concave section configured to captively contain the end cap member while allowing the end cap member to rotate within the concave section.
5. The article security device of any preceding clause, wherein the containment portion further comprises opposing side walls that define an opening, wherein the opening is dimensioned so that the end cap member cannot pass through while allowing the elongate member to pass therethrough.
6. The article security device of any preceding clause, wherein the opening is an elongated slot allowing the elongate member and the end cap member to pivot with respect to the security tag.
7. The article security device of clause 1, further comprising an end cap member connected to the elongate member first end, wherein the security tag includes a containment portion having an internal wall that defines a through hole that extends through the security tag and is configured to have the elongate member passed therethrough so that the security tag is contained on the elongate member between the locking member and the end cap member.
8. The article security device of clause 7, wherein the through hole has a first diameter, the elongate member has a second diameter smaller than the first diameter, and the end cap member and the locking member each have a size larger than the first diameter.
9. The article security device of any preceding clause, wherein the elongate member second end further comprises a pin and the locking mechanism further comprises a ball-clutch mechanism, wherein the ball-clutch mechanism is configured to lockingly engage with the pin in the locked position and to release the pin in the unlocked position.
10. The article security device of any preceding clause, wherein the elongate member is a flexible cable.
11. The article security device of any preceding clause, wherein the elongate member is rigid or semi-rigid.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the above-mentioned aspects. Some of those modifications have been discussed and others will be understood by those skilled in the art. It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. An article security device that is selectively removable from an article, comprising:

a security tag with a housing including a security element and a containment structure;

an elongate member movably connected with the security tag and having an elongate member first end with an end cap member coupled thereto, wherein the end cap member is moveably retained within the containment structure, and an elongate member second end with a pin, wherein the elongate member is configured to contain or to be contained by at least a portion of the article; and a selectively removable locking member, separate from the housing, that is configured to lockably engage with the pin at the elongate member second end to enable the article security device to be selectively locked to and removable from the article, wherein the selectively removable locking member includes a locking mechanism having a locked position preventing removal of the selectively removable locking member from the pin at the elongate member second end and an unlocked position allowing for removal of the selectively removable locking member from the pin at the elongate member second end.

2. The article security device of claim 1, wherein the elongate member has a first diameter, and the end cap member is connected to the elongate member first end and has a second diameter that is larger than the first diameter.

3. The article security device of claim 2, wherein the containment structure comprises a concave section configured to captively contain the end cap member while allowing the end cap member to rotate within the concave section.

4. An article security device that is selectively removable from an article, comprising:

a security tag with a housing including a security element and a containment portion; an elongate member movably connected with the security tag and having an elongate member first end with an end cap member coupled thereto, and an elongate member second end with a pin, wherein the elongate member is configured to contain or to be contained by at least a portion of the article; and a selectively removable locking member, separate from the housing, that is configured to lockably engage with the pin at the elongate member second end to enable the article security device to be selectively locked to and removable from the article, wherein the selectively removable locking member includes a locking mechanism having a locked position preventing removal of the selectively removable locking member from the pin at the elongate member second end and an unlocked position allowing for removal of the selectively removable locking member from the pin at the elongate member second end, wherein the containment portion further comprises opposing side walls that define an opening, wherein the opening is dimensioned so that the end cap member cannot pass through while allowing the elongate member to pass therethrough.

5. The article security device of claim 4, wherein the opening is an elongated slot allowing the elongate member and the end cap member to pivot with respect to the security tag.

6. The article security device of claim 4, wherein the housing includes a containment portion having an internal wall that defines a through hole that extends through the security tag and is configured to have the elongate member passed therethrough so that the security tag is constrained on the elongate member between the locking member and the end cap member.

7. The article security device of claim 6, wherein the through hole has a first diameter, the elongate member has a second diameter smaller than the first diameter, and the end cap member and the locking member each have a size larger than the first diameter.

8. The article security device of claim 1, wherein the locking mechanism further comprises a ball-clutch mechanism, wherein the ball-clutch mechanism is configured to lockingly engage with the pin in the locked position and to release the pin in the unlocked position.

9. The article security device of claim 1, wherein the elongate member is a flexible cable.

10. The article security device of claim 1, wherein the elongate member is rigid or semi-rigid.

11. The article security device of claim 4, wherein the locking mechanism further comprises a ball-clutch mechanism, wherein the ball-clutch mechanism is configured to lockingly engage with the pin in the locked position and to release the pin in the unlocked position.

12. The article security device of claim 4, wherein the elongate member is a flexible cable.

13. The article security device of claim 4, wherein the elongate member is rigid or semi-rigid.

14. The article security device of claim 4, further comprising an end cap housing, wherein the end cap housing comprises a concave section configured to captively contain the end cap member while allowing the end cap member to rotate within the concave section.

* * * * *